(12) United States Patent
Cochran et al.

(10) Patent No.: US 11,214,714 B2
(45) Date of Patent: Jan. 4, 2022

(54) THERMOPLASTIC POLY ACRYLATED GLYCEROL ADHESIVES USEFUL IN CELLULOSIC PRODUCTS

(71) Applicants: Iowa State University Research Foundation, Inc., Ames, IA (US); Midwest Acrylated Processes, LLC, Crestwood, IL (US)

(72) Inventors: Eric W. Cochran, Ames, IA (US); Nacu B. Hernandez, Ames, IA (US); R. Chris Williams, Ames, IA (US); Michael Forrester, Ames, IA (US); David Grewell, Ames, IA (US); Andrew Becker, Ames, IA (US); Joseph J. Marcinko, Mantua Township, NJ (US)

(73) Assignees: IOWA STATE UNIVERSITY RESEARCH FOUNDATION, INC., Ames, IA (US); MIDWEST ACRYLATED PROCESSES, LLC, Crestwood, IL (US)

( * ) Notice: Subject to any disclaimer, the term of this patent is extended or adjusted under 35 U.S.C. 154(b) by 0 days.

(21) Appl. No.: 16/405,697

(22) Filed: May 7, 2019

(65) Prior Publication Data
US 2019/0345369 A1 Nov. 14, 2019

Related U.S. Application Data

(60) Provisional application No. 62/668,655, filed on May 8, 2018.

(51) Int. Cl.
*C09J 133/14* (2006.01)
*C08L 97/02* (2006.01)
(Continued)

(52) U.S. Cl.
CPC .......... *C09J 133/14* (2013.01); *B27N 3/002* (2013.01); *B27N 3/02* (2013.01); *B27N 3/04* (2013.01); *C08F 120/20* (2013.01); *C08L 97/02* (2013.01)

(58) Field of Classification Search
CPC ....... C09J 133/14; C08L 33/14; C08F 120/20; B27N 3/002; B27N 3/02; B27N 3/04
See application file for complete search history.

(56) References Cited

U.S. PATENT DOCUMENTS 2,586,473 A 2/1952 Mead et al.
3,993,663 A * 11/1976 Takiyama ............ C07D 493/10
549/335

(Continued)

FOREIGN PATENT DOCUMENTS

EP 0013487 B1 4/1984
WO 99/19141 4/1999
WO WO-2016009062 A1 * 1/2016 ............ C09J 131/04

OTHER PUBLICATIONS

Grewell et al., "Bio-Based Construction Adhesives," Center for Bioplastics and Biocomposites ANTEC Anaheim Presentation (2017).

(Continued)

*Primary Examiner* — Nicholas E Hill
(74) *Attorney, Agent, or Firm* — Troutman Pepper Hamilton Sanders LLP (Rochester)

(57) ABSTRACT

The present invention relates to an adhesive comprising a thermoplastic polyacrylated glycerol polymer, water, and a cross linker that is reactive with the polyacrylated glycerol polymer. This adhesive is useful in the formation of cellulosic products including oriented strand board (OSB), particle board, oriented structural straw board, chipboard, plywood, laminated veneer lumber (LVL), pressed wood, glued laminated timber (glulam), cross-laminated timber (CLT), (Continued)

A

5 % Neat Acrylated Glycerin

B

4 % Neat Acrylated Glycerin and other wood products. Methods of producing the adhesive and cellulosic products are also disclosed.

8 Claims, 15 Drawing Sheets

(51) Int. Cl.
  *B27N 3/04* (2006.01)
  *B27N 3/00* (2006.01)
  *B27N 3/02* (2006.01)
  *C08F 120/20* (2006.01)

(56) References Cited

U.S. PATENT DOCUMENTS

| | | | | |
|---|---|---|---|---|
| 5,318,990 | A | * | 6/1994 | Strauss ............... C08F 8/14 524/549 |
| 5,340,868 | A | * | 8/1994 | Strauss ............... C03C 25/26 524/461 |
| 5,661,213 | A | * | 8/1997 | Arkens ............... C08F 8/14 524/555 |
| 6,274,661 | B1 | * | 8/2001 | Chen ............... C03C 25/26 524/388 |
| 6,699,945 | B1 | * | 3/2004 | Chen ............... C08F 8/14 525/437 |
| 6,884,849 | B2 | * | 4/2005 | Chen ............... C09D 129/04 427/385.5 |
| 8,022,257 | B2 | | 9/2011 | Li et al. |
| 10,066,051 | B2 | | 9/2018 | Cochran et al. |
| 2015/0337078 | A1 | * | 11/2015 | Cochran ............... C08L 95/00 507/219 |
| 2017/0204044 | A1 | * | 7/2017 | Hashimoto ........... C07D 251/30 |
| 2017/0355892 | A1 | * | 12/2017 | Heucher ............... C09J 175/02 |

OTHER PUBLICATIONS

Grewell et al. "Bio-Based Construction Adhesives," SPE ANTEC Anaheim, pp. 1662-1666 (2017).

* cited by examiner

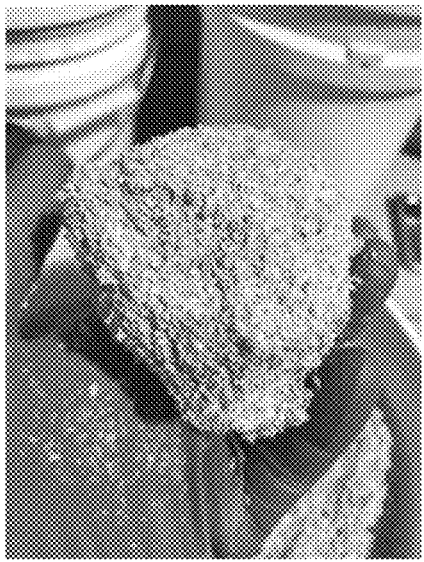 
FIG. 8A-B

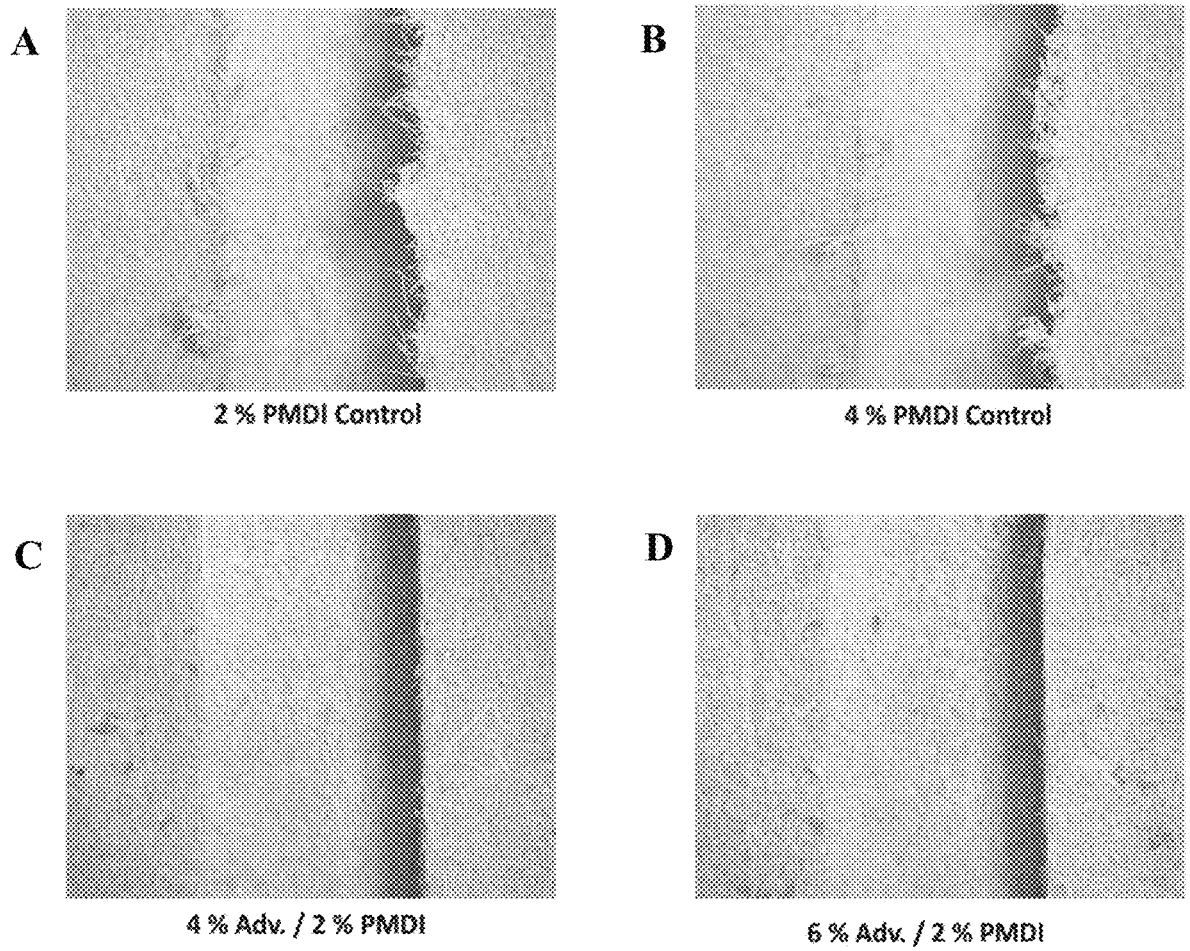
FIG. 13A-D

THERMOPLASTIC POLY ACRYLATED GLYCEROL ADHESIVES USEFUL IN CELLULOSIC PRODUCTS

This application claims the benefit of U.S. Provisional Patent Application Ser. No. 62/668,655, filed May 8, 2018, which is hereby incorporated by reference in its entirety.

This invention was made with government support under Grant No. 2014-38202-22318 awarded by the United States Department of Agriculture/National Institute of Food and Agriculture. The government has certain rights in the invention.

FIELD OF THE INVENTION

The present invention relates to thermoplastic poly acrylated glycerol adhesives useful in cellulosic products.

BACKGROUND OF THE INVENTION

Adhesives suitable for preparing wood products can be fluid, semi-fluid, or materials that can become fluid with external assistance such as heating (e.g., hot-melt adhesives). When applied between two objects, the solidification of the adhesives stick the objects together. The adhesive industry is divided into the packaging industry with a 37% share of the total market, the construction industry with a 20% share (e.g., carpet laying, roofing, pre-finished panels, etc.), the automobile industry with a 19% share, the laminates industry with a 12% share (e.g., labelling, veneers, laminates), the footwear industry with a 5% share, the consumer industry with a 4% share, and other markets constituting the remaining 3% share.

The global market for adhesives in 2013 was estimated by the Adhesive and Sealant Council to be $40.5 billion in sales (approximately 9000 kilo tons) and is expected to reach $58 billion in sales by 2018 (approximately 12,400 kilo tons). There thus remains a strong need in the art for new types of cost-effective, environment-friendly, viable polymers that can be used as adhesives.

Rising demand for wood products and depletion of virgin forests has led to the search for more efficient use of harvested timber and to the development of alternatives to natural solid wood lumber products. First, plywood and, more recently, wood composition fiberboard and particleboard were often found to be acceptable alternatives to natural wood paneling, sheathing, and decking lumber. Fiberboard and particleboard lumber are built-up from wood particles bonded together by an adhesive, the adhesive being selected according to the intended use of and the properties desired for the lumber. In some fiberboard and particleboard lumber products, wood particles have been combined with other cellulosic materials, such as vegetable fibers, pulp and the like. A significant advantage of fiberboard and particleboard lumber products is that they have many of the properties of plywood; however, they can be made from lower grade wood species and waste from other wood product production, and can be formed into lumber in lengths and widths independent of size of the harvested timber.

The principal goal in producing alternatives to natural solid wood lumber is achieving properties like those of the equivalent natural solid wood lumber, especially, the properties of retaining strength, durability, stability and finish under exposure to expected environmental and use conditions.

Formaldehyde-based resins such as phenol-formaldehyde resin, melamine-formaldehyde resin and urea-formaldehyde resin are widely used as binders in the production of wood-based products. Upon curing a formaldehyde-based resin, formaldehyde may be released both during the manufacture of the wood-based product and also later during use of the product. Formaldehyde emission to indoor air has been a major health concern for many years. Hence, there is an increasing demand for formaldehyde-free wood adhesives which give sufficient bond strength and overall end-product quality making them suitable as alternatives to prior art adhesives containing formaldehyde-based resins.

As an alternative to formaldehyde-based resins in wood adhesive isocyanate binders are currently used, but they require the use of high press temperatures during the manufacture of composite boards from these wood substrates. Press temperatures as high as 430° F., or even higher, are often needed in order to achieve an effective cure of the adhesive in a reasonable period of time. There is a trade off between press temperature and residence time in the press. Lower press temperatures generally equate to longer residence times. Longer residence times are undesirable in industry, because these reduce the throughput of the manufacturing process. High press temperatures require more energy and often cause undesirable amounts of VOC (volatile organic compounds) emissions from the substrate during pressing. In addition, the high temperatures often cause thermal damage to the composite boards, and, in some circumstances, even fires in the press. The high heat requirements can also drive the moisture content of the end product (board) to undesirably low levels.

The types of polyisocyanate adhesives used in industrial practice are almost invariably isocyanates of the MDI series, usually polymeric MDI (which refers to various mixtures of diphenylmethane diisocyanates and higher molecular weight polymethylene polyphenyl polyisocyanate oligomers). These polyisocyanate adhesives represent an improvement over older types of adhesives, most notably phenol-formaldehyde type adhesives, in terms of the quality of the boards produced. The wood composites produced using MDI adhesives are generally more resistant to moisture damage than similar boards made with phenol-formaldehyde resins. An additional advantage of MDI adhesives, which has made them increasingly attractive in the OSB (oriented strand board) industry, is greater moisture tolerance in the substrate. MDI adhesives, as opposed to phenol-formaldehyde resins, can often be used on wood substrates that have higher moisture content. Phenol-formaldehyde resins require very high pressing temperatures for industrially practical press residence times. However, poly methylene diisocyanate does not possess the tack that the formaldehyde based adhesives do and therefore the wood substance needs to be held together before being cured, adding to the processing time and equipment necessary to form the wood based product. Additionally, it would be desirable to utilize an adhesive with low cost, created from renewable resources.

The present invention is directed to overcoming these and other deficiencies in the art.

SUMMARY OF THE INVENTION

One aspect of the present invention relates to an adhesive comprising a thermoplastic polyacrylated glycerol polymer, water, and a cross linker that is reactive with the polyacrylated glycerol polymer when the polyacrylated glycerol polymer and cross linker are mixed.

Another aspect of the present invention relates to a cellulosic product which includes an adhesive comprising a thermoplastic polyacrylated glycerol polymer, water, and a cross linker, along with cellulosic particles or pieces mixed with and bonded by the adhesive.

A further aspect of the present invention relates to a method of making an adhesive. This method comprises providing a thermoplastic polyacrylated glycerol polymer, and providing a cross linker reactive with the thermoplastic polyacrylated glycerol polymer. The cross linker and the polyacrylated glycerol polymer are mixed with water to form an adhesive.

Another aspect of the present invention relates to a method of making a cellulosic product comprising providing a polyacrylated glycerol polymer and providing a cross-linker reactive with the polyacrylated glycerol. The cross-linker and the polyacrylated glycerol polymer are mixed with water to form an adhesive. The adhesive is then blended with cellulosic particles or pieces to form a blend. The blend may then be formed into a desired shape.

Glycerol (1,2,3-propanetriol) is typically derived from both natural and petrochemical feedstocks (e.g., it is a co-product from the production of biodiesel, via soybean oil and other feedstocks), and is considered one of the most versatile chemicals for its wide range of applications. It is the backbone of all animal and vegetable triglycerides, constituting an average 10 wt % of the fatty portion. With the recent explosion in production of biofuels, glycerol has rapidly become a surplus in the market, as it is created as a byproduct in the manufacturing of biodiesel by transesterification of vegetable oils with methanol using NaOH as a catalyst (Pagliaro et al., "The Future of Glycerol: 2nd Edition. RSC Green Chemistry," (The Royal Society of Chemistry, $2^{nd}$ ed. 2010), which is herein incorporated by reference in its entirety). Glycerol is "green," inexpensive, and offers multiple functional sites that can be exploited to alter its properties to be incorporated into biobased polymers. The availability and low cost of glycerol extends to the use of the thermoplastic polyacrylated glycerol polymers making the adhesive and cellulosic products of the present invention economically attractive.

Glycerol is converted by standard acid- or base-catalyzed condensation chemistry to contain the conjugated and readily polymerizable acrylic (C=O—C=C) moiety. The resulting acrylated glycerol can be represented by $AG_x$, in which x represents the average number of acrylic groups per molecule. Controlled free radical polymerization techniques, such as atom transfer radical polymerization (ATRP) and reversible addition-fragmentation chain transfer polymerization (RAFT) can be applied to the acrylated glyerol monomers to yield thermoplastic rubbers or elastomers suitable for adhesive compositions.

This technology enables the development of "green" and economical alternatives to petrochemically derived thermoplastic polymers. The resulting poly acrylated glycerol-based thermoplastic polymers can be used in thermoplastic rubber or elastomeric compositions for a variety of adhesives (e.g., pressure-sensitive adhesives, or hot-melt adhesives).

During the manufacture of particle board and plywood, formaldehyde-based adhesives such as urea formaldehyde provide tack holding the wood particles or plies together before pressing. Poly methylene diisocyanate (PMDI) is not tacky and caul sheets must be used to keep particles from spilling. Unlike neat PMDI, uncured poly acrylated glycerol (PAG) and PAG mixed with PMDI at a 2:1 or higher PAG:PMDI ratio is tacky and holds together the particle board particles or plywood plies before curing. PAG/PMDI adhesive blends provide the following advantages over neat PMDI in the production of medium density fiberboard (MDF): less release agents are needed to keep the cured MDF from sticking to the pressing platens or pressing belt, and the PAG/PMDI blends have cleaner machined surfaces with less fiber tear out.

BRIEF DESCRIPTION OF THE DRAWINGS

FIGS. 8A-B are images showing poly acrylated glycerol treated particles of wood, at 4% (FIG. 12A) and 6% (FIG. 12B), sticking together after light pressure.

FIG. 13A-D are images showing MDF samples made with PAG having improvement in machinability as demonstrated by the reduction in fiber pull out in the boards.

DETAILED DESCRIPTION OF THE INVENTION

Figure 1:
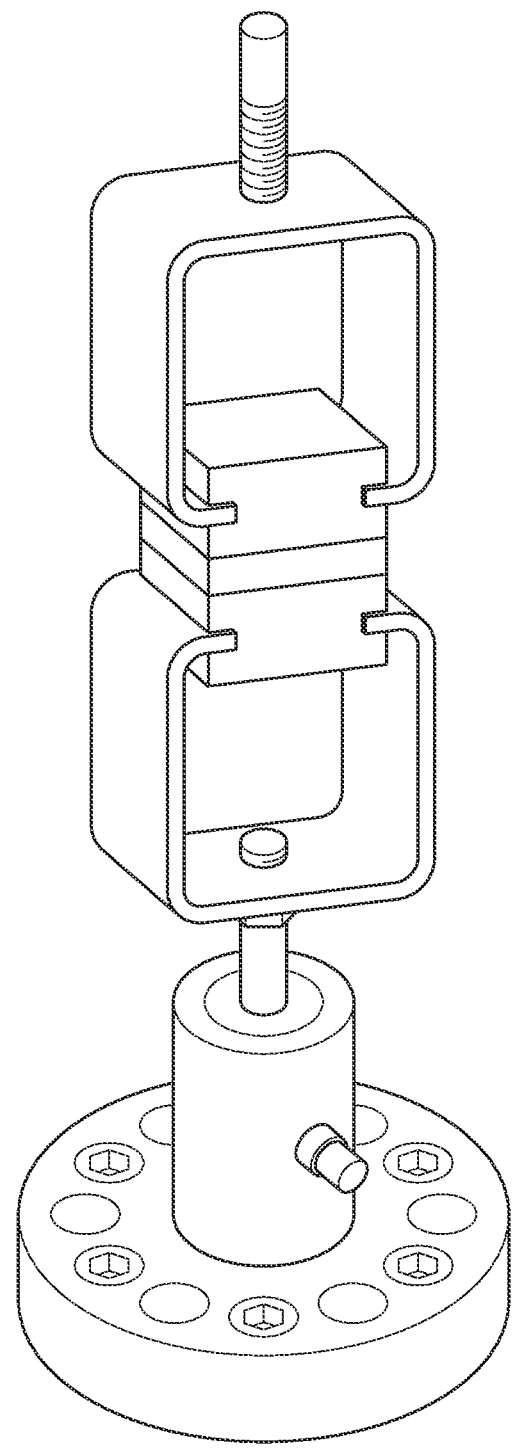
FIG. 1 is an image of an oriented strand board sample coupon being tested in a universal load frame for the determination of the internal bond strength.

As used above, and throughout the description herein, the following terms, unless otherwise indicated, shall be understood to have the following meanings. If not defined otherwise herein, all technical and scientific terms used herein have the same meaning as is commonly understood by one of ordinary skill in the art to which this technology belongs. In the event that there is a plurality of definitions for a term herein, those in this section prevail unless stated otherwise.

The term "copolymer" refers to a polymer derived from more than one species of monomer.

The term "random copolymer" or "random polymer" refers to a copolymer in which there is no definite order for the sequence of the different building blocks $(-M_1M_2M_1M_1M_2M_1M_2M_2-)$.

The term "block copolymer" or "block polymer" refers to a macromolecule consisting of long sequences of different repeat units. Exemplary block polymers include, but are not limited to $A_nB_m$, $A_nB_mA_m$, $A_nB_mC_k$, or $A_nB_mC_kA_n$.

The term "cure" as used herein refers to exposing to radiation in any form, heating, or allowing to undergo a physical or chemical reaction that results in hardening or an increase in viscosity.

The term "(meth)acrylate" as used herein refers to both methacrylate and acrylate.

The term "Volatile organic compound" means materials having organic chemicals that have a high vapor pressure at ordinary, room-temperature conditions. Their high vapor pressure results from a low boiling point, which causes large numbers of molecules to evaporate from the liquid or solid form of the compound and enter the surrounding air. An example is formaldehyde, with a boiling point of −19° C. (−2° F.), slowly exiting paint and getting into the air. The term "zero VOC" means a material having zero detectable VOC's using standard detection equipment.

One aspect of the present invention relates to an adhesive comprising a thermoplastic polyacrylated glycerol polymer, water, and a cross linker that is reactive with the polyacrylated glycerol polymer when the polyacrylated glycerol polymer and cross linker are mixed.

In one aspect of the present invention the thermoplastic polyacrylated glycerol is present in the adhesive in an amount of 10 to 99 wt %, or more preferably in an amount of 30 to 70 wt %. Furthermore, the cross linker is present in the adhesive in an amount of 1 to 90 wt %, or preferentially in an amount of 10 to 50 wt %. Additionally, the water is present in the adhesive in an amount of 1 to 90 wt %, or preferentially in an amount of 30 to 70 wt %.

The structure of an exemplary poly(acrylated glycerol) molecule is shown in Scheme 1. Scheme 1 shows that the thermoplastic copolymer is a mixture of X units of mono-acrylated glycerol, Y units of di-acrylated glycerol, and Z units of tri-acrylated glycerol, and the resulting x, the average degree of acrylation of the poly(acrylated glycerol) molecule can be theoretically calculated as (X+Y+Z)/3.

Scheme 1

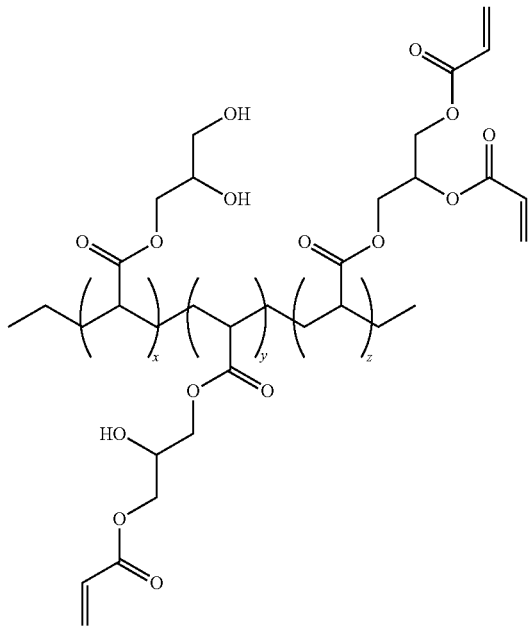

The thermoplastic polyacrylated glycerol copolymer has a linear or branched-chain structure, and has properties characteristic of thermoplastic substances in that it has the stability necessary for processing at elevated temperatures and yet possesses good strength below the temperature at which it softens. The thermoplastic polyacrylated glycerol copolymer has a glass transition temperature ($T_g$) below 0° C., for instance, from −60° C. to 0° C., from −60° C. to −15° C., or from −45° C. to −20° C. The thermoplastic polyacrylated glycerol copolymer has a molecular weight of at least 1 KDa, for instance, a molecular weight of 1 KDa to 10 MDa, 10 KDa to 1 MDa, 50 KDa to 10 MDa, or 50 KDa to 200 KDa.

The acrylated glycerol monomeric unit can contain one or more conjugated sites that can increase the reactivity of acrylated glycerol towards propagation reactions in the controlled radical polymerization. The acrylated glycerol monomeric unit can be represented by $AG_x$, in which x represents the average number of acrylic groups per acrylated polyol molecule. At least one and as many as the maximum number of the hydroxyl functionalities in the glycerol molecule can be arylated in the acrylated glycerol monomeric unit. For example, glycerol contains 3 hydroxyl groups, and thus, in the acrylated glycerol $AG_x$, x can range from greater than 0 to 3. In the monomeric acrylated glycerol there can be a mixture of various acrylated glycerol with different degrees of acrylation. For example, while the majority monomeric acrylated glycerol unit of $AG_1$ may be mono-acrylated glycerol, there can also be small populations of acrylated polyol monomeric unit that are non-acylated glycerol and di-acrylated glycerol (i.e., 2 hydroxyl groups of glycerol are acrylated) as well. Moreover, the monomeric acrylated glycerol can also possess a small number of oligomers of acrylated glycerol, as the autopolymerization of the acrylic groups may not be completely suppressed. Accordingly, while $AG_x$ is referred to as "monomers" herein, it is to be understood that these monomeric units can contain mixtures having a distributions of various degree of acrylation and various molecular weight. Because the acrylated glycerol monomeric unit is a mixture of various acrylated glycerols, the resulting thermoplastic polymer is considered as a copolymer. The average degree of acrylation in acrylated glycerol can range from 0.01 to 3. Typically, the average degree of acrylation in acrylated glycerol ranges from 1.001 to 2.9, for instance, from 1.001 to 1.25.

An acrylated glycerol composition can be prepared by reacting glycerol with an acrylic reagent. The glycerol is acrylated through a standard acid- or base-catalyzed condensation reaction. This reaction typically occurs at a mild temperature and produces water as the non-recyclable waste product. The reaction imparts acrylic functionality to the glycerol molecule, rendering it to be readily polymerized.

The acrylic reagent used can be an unsaturated carboxylic acid or an acidic halide. Suitable acrylic reagents include, but are not limited to, acrylic acid, acryloyl chloride, methacrylic acid, or other acid or acidic halide terminated with a vinyl.

The polymerizing of acrylated glycerol is performed through living free radical polymerization which involves living/controlled polymerization with free radical as the active polymer chain end (Moad et al., "The Chemistry of Radical Polymerization—Second Fully Revised Edition," Elsevier Science Ltd. (2006), which is hereby incorporated by reference in its entirety). This form of polymerization is a form of addition polymerization where the ability of a growing polymer chain to terminate has been removed. The rate of chain initiation is thus much larger than the rate of chain propagation. The result is that the polymer chains grow at a more constant rate than seen in traditional chain polymerization and their lengths remain very similar. The polymerizing step typically occurs in the presence of a free radical initiator, and a catalyst or a chain transfer agent to form the thermoplastic copolymer.

The distinctive feature of this polymerization is that it allows the design of the molecular architecture of the resultant polymers such that they are predominantly non-crosslinked linear or lightly branched chains that behave as rubbers/elastomers at room temperature but reversibly melt and are susceptible to common processing techniques at elevated temperatures. The success of the technology on polyols such as glycerol, sorbitol, or dextrose is surprising, as the multifunctional nature of polyol such as glycerol, sorbitol or dextrose have likely eliminated them as being considered as candidates for the basis of chain growth polymerization chemistries—even $AG_1$ (acrylated glycerol having an average of one acrylic group per molecule) contains a significant fraction of di- and even tri-acrylated moieties. Thus, it is reasonably expected that it would be fairly difficult to polymerize these monomers to result in a high molar mass thermoplastic polymer without gelation. However, under certain conditions, ATRP and RAFT polymerizations can be successfully applied to polymerize acrylated polyols to achieve a high molecular weight and conversion rate.

A more detailed description of suitable polyacrylated glycerol polymers in accordance with the present invention and the use of controlled radical polymerization to produce such polymers is set forth in U.S. Patent Publication No. 2015/0337078 to Cochran et al., which is hereby incorporated by reference in its entirety.

The crosslinking agents interact with the pendent hydroxyl groups on the polyacrylated glycerol polymer or with residual acrylic groups. This helps improve the water resistance of the polyacrylate glycerol adhesive. Preferably the crosslinking agents are diisocyanates. Exemplary diisocyanates suitable for the present invention include polymeric methylene diphenyl diisocyanate (PMDI), 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanato-methyl-3,5,5-trimethylcyclohexane (isophorone diisocyanate or IPDI), 4,4'-and/or 2,4'-diisocyanato-dicyclohexylmethane, 1,3- and 1,4-bis(isocyanato-methyl)-cyclohexane, bis-(4-isocyanato-3-methyl-cyclohexyl)-methane, xylylene diisocyanate, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 2,4- and/or 2,6-toluene diisocyanate, 2,4- and/or 4,4'-diphenylmethane diisocyanate, 4,4'-Methylenebis(cyclohexyl isocyanate), etc. Additionally, mixtures of these diisocyanates may also be used.

Other crosslinking agents that can interact with the residual acrylic groups on the polyacrylated glycerol polymer of the adhesive include multiply (meth)acylated cross-linkers such as diethyleneglycol dimethacrylate (DEGDMA), diethylene glycol diacrylate, triethylene glycol dimethacrylate (TEGDMA), ethyleneglycol dimethacrylate (EGDMA), hexane-1,6-diol diacrylate (HDDA), ethylene glycol diacrylate, ethylene glycol dimethacrylate, poly(ethylene glycol) diacrylate, poly(ethylene glycol) dimethacrylate, tetra(ethylene glycol) diacrylate, triethylene glycol dimethacrylate, etc.

Furthermore, crosslinking agents such as poly acids, anhydrides, and acid halides have also shown to be useful in the present invention. Exemplary cross linkers of these types include maleic acid, 2-methylmaleic acid, itaconic acid, 2-methylitaconic acid, α,β-methyleneglutaric acid, maleic anhydride, itaconic anhydride, acrylic anhydride, methacrylic anhydride, 1,4-Phenylenediacryloyl chloride, etc.

In a further aspect of the invention the cross linker is selected from the group consisting of diisocyanates, anhydrides, multiply (meth)acrylated cross linkers, polyacids, and acid halides. Preferentially the cross linker is poly methylene diisocyanate In one embodiment of the present invention the thermoplastic polyacrylated glycerol polymer has a molecular weight ranging from 10 kDa to 10 MDa, or more preferably a molecular weight ranging from 500 kDa to 2 MDa.

In another embodiment of the present invention the thermoplastic polyacrylated glycerol polymer has a glass transition temperature ($T_g$) below 0° C.

In yet another embodiment of the present invention the adhesive has a shear strength ranging from 0 to 50 MPa, particularly, 5 to 25 MPa. Furthermore, the adhesive has an internal bond strength of 0 to 1.5 MPa.

The adhesive of the invention can further include an additive selected from the group consisting of inhibitors, initiators, and copolymers.

The initiating agents often are referred to as "initiators." Suitable initiators depend greatly on the details of the polymerization, including the types of monomers being used, the type of catalyst system, the solvent system, and the reaction conditions. A typical radical initiator can be azo compounds, which provide a two-carbon centered radical. Both photo and thermal initiators can be used in the present invention.

Thermal radical initiators such as benzoyl peroxide, di-t-amyl peroxide, t-butyl peroxy benzoate, and di-cumyl peroxide, azobisisobutyronitrile (AIBN), 1,1' azobis(cyclohexanecarbonitrile) or (ABCN), or 4,4'-Azobis(4-cyanovaleric acid) (ACVA), (2,2'-azobis(2,4- dimethylpentanenitrile), (2,2'-azobis(cyclohexane-carbonitrrle), decompose upon heating into radical fragments which initiate polymerization. A preferential initiator in the present invention is 4,4'-Azobis(4-cyanovaleric acid) or potassium persulfate.

Photo initiators when irradiated with UV light, produce free radicals which initiate photopolymerization. Some exemplary photoinitiators are 2,2-dimethoxy-1,2-diphenyl-ethan-1-one, and (2,4,6-trimethylbenzoyl)-diphenylphosphine oxide.

The adhesive may include other monomers, or polymers formed from the exemplary monomers, in addition to the polyacrylated glycerol to adjust the adhesive properties, including vinyl aromatic monomers such as styrene, α-methyl styrene, t-butyl styrene, vinyl xylene, vinyl naphthalene, vinyl pyridine, divinyl benzene, N-vinyl heteroaromatics (such as 4-vinylimidazole (Vim), N-vinylcarbazole (NVC), N-vinylpyrrolidone, etc.). Other exemplary vinyls include vinyl esters (such as vinyl acetate (VAc), vinyl butyrate (VB), vinyl benzoate (VBz)), N-vinyl amides and imides (such as N-vinylcaprolactam (NVCL), N-vinylpyrrolidone (NVP), N-vinylphthalimide (NVPI), etc.), vinylsulfonates (such as 1-butyl ethenesulfonate (BES), neopentyl ethenesulfonate (NES), etc.), vinylphosphonic acid (VPA), haloolefins (such as vinylidene fluoride (VF2)), etc. Exemplary methacrylates include $C_1$-$C_6$ (meth)acrylate (i.e., methyl methacrylate, ethyl methacrylate, propyl (meth) acrylate, butyl (meth)acrylate, isobutyl methacrylate, heptyl (meth)acrylate, or hexyl (meth)acrylate), 2-(acetoacetoxy) ethyl methacrylate (AAEMA), 2-aminoethyl methacrylate (hydrochloride) (AEMA), allyl methacrylate (AMA), cholesteryl methacrylate (CMA), t-butyldimethylsilyl methacrylate (BDSMA), (diethylene glycol monomethyl ether) methacrylate (DEGMA), 2-(dimethylamino)ethyl methacrylate (DMAEMA), (ethylene glycol monomethyl ether) methacrylate (EGMA), 2-hydroxyethyl methacrylate (HEMA), dodecyl methacrylate (LMA), methacryloyloxyethyl phosphorylcholine (MPC), (poly(ethylene glycol) monomethyl ether) methacrylate (PEGMA), pentafluorophenyl methacrylate (PFPMA), 2-(trimethylamonium)ethyl methacrylate (TMAEMA), 3-(trimethylamonium)propyl methacrylate (TMAPMA), triphenylmethyl methacrylate (TPMMA), etc. Other exemplary acrylates include 2-(acryloyloxy)ethyl phosphate (AEP), butyl acrylate (BA), 3-chloropropyl acrylate (CPA), dodecyl acrylate (DA), di(ethylene glycol) 2-ethylhexyl ether acrylate (DEHEA), 2-(dimethylamino)ethyl acrylate (DMAEA), ethyl acrylate (EA), ethyl α-acetoxyacrylate (EAA), ethoxyethyl acrylate (EEA), 2-ethylhexyl acrylate (EHA), isobornyl acrylate (iBoA), methyl acrylate (MA), propargyl acrylate (PA), (poly(ethylene glycol) monomethyl ether) acrylate (PEGA), tert-butyl acrylate (tBA), etc. Exemplary methacrylamides include N-(2-aminoethyl)methacrylamide (hydrochloride) (AEMAm) and N-(3-aminopropyl)methacrylamide (hydrochloride) (APMAm), N-(2-(dimethylamino)ethyl)acrylamide (DEAPMAm), N-(3-(dimethylamino)propyl)methacrylamide (hydrochloride) (DMAPMAm), etc. Other exemplary acrylamides include acrylamide (Am) 2-acrylamido-2-methylpropanesulfonic acid sodium salt (AMPS), N-benzylacrylamide (BzAm), N-cyclohexylacrylamide (CHAm), diacetone acrylamide (N-(1,1-dimethyl-3-oxobutyl) acrylamide) (DAAm), N,N-diethylacrylamide (DEAm), N,N-dimethylacrylamide (DMAm), N-(2-(dimethylamino)ethyl) acrylamide (DMAEAm), N-isopropylacrylamide (NIPAm), N-octylacrylamide (OAm), etc. Exemplary nitriles include acrylonitrile, adiponitrile, methacrylonitrile, etc. Exemplary diolefins include butadiene, isoprene, etc.

In some embodiments of the present invention, the adhesive composition can include an inhibitor. Exemplary inhibitors include, but are not limited to, phenothiazine, hydroquinone, or antioxidant inhibitors such as the ETHANOX™ family (SI Group) (e.g., ETHANOX 330™), IRGANDX (BASF) and STABOXOL (Rhein Chemie).

A further aspect of the present invention relates to a method of making an adhesive. This method comprises providing a thermoplastic polyacrylated glycerol polymer, and providing a cross linker reactive with the thermoplastic polyacrylated glycerol polymer. The cross linker and the polyacrylated glycerol polymer are mixed with water to form an adhesive. The adhesive is applied and then cured by heating or irradiation. Total moisture content in the particle board should be kept below 12-13%. PMDI can be applied to wood with a moisture content of 8-9%, because PMDI reacts with water to form carbon dioxide. Urea formaldehyde adhesives are applied to particles with a moisture content of 5%, because that adhesive is waterborne.

Another aspect of the present invention relates to a cellulosic product which includes an adhesive comprising a thermoplastic polyacrylated glycerol polymer, water, and a cross linker, along with cellulosic particles or pieces mixed with and bonded by the adhesive. When thinned with water, to 46% solids content or less, the polyacrylated glycerol has a viscosity suitable for atomized spraying. Higher solids content polyacrylated glycerol can be with other methods (e.g., a pneumatic gun, electric gun, jetting, fiberized spray, slot applicator, roller applicators, brush applicators, etc.).

In this aspect of the present invention the adhesive is formulated and prepared as set forth above.

The types of cellulosic materials generally preferred include wood particles or pieces, wood fibers, wood chips, sawdust, and like materials; agricultural by-products such as straw, bagasse, hemp, jute, and like materials; waste paper products and paper pulp; combinations of these; and the like.

The wood particles or pieces can be wood shavings or strands, flat veneer layers, or timber pieces. The wood particles or pieces can be of a single size or a mixture of differing sizes and shapes.

The construction of the cellulosic product of the present invention also permits the use of common additives, such as fire retardants, insect repellants, color dyes, etc., to impart additional properties to the resulting products. Also, other cellulosic materials can be used to supplement the more desirable wood particles for economy reasons, if the concomitant change in the properties of the resulting product is acceptable. See U.S. Pat. No. 4,364,984, which is hereby incorporated by reference in its entirety.

In WO 03/099533, which is hereby disclosed by reference in its entirety, is disclosed a method of providing flame retardant OSB plates. According to the disclosed method, wood pieces are impregnated with a flame retardant composition before they are processed into strands. The impregnation with the flame retardant is done by the application of a so called vacuum-pressure process, wherein the wood first is subjected to a vacuum; subsequently the flame retardant composition is added and subjected to pressure in order to impregnate the wood pieces. These impregnated wood pieces are then processed into strands that are subsequently used to produce OSB plates in a traditional way.

U.S. Pat. No. 4,241,133, which is hereby incorporated by reference in its entirety, discloses a wood composite containing about 5 to 12 weight % of a binder and, optionally, additives, such as wax, for waterproofing and preservatives for protection against fungi and insects.

The adhesive mixed with and bonded to the cellulosic product is cured.

The cellulosic product is in the form of a planar board. Furthermore the adhesive may be present in the planar board in an amount of 40-200 g/m².

In another aspect of the invention the cellulosic product is selected from oriented strand board (OSB), particle board, oriented structural straw board, chipboard, plywood, laminated veneer lumber (LVL), pressed wood, glued laminated timber (glulam), cross-laminated timber (CLT), low, medium, or high density fiberboard, and other wood products.

Another aspect of the present invention relates to a method of making a cellulosic product comprising providing a polyacrylated glycerol polymer and providing a cross-linker reactive with the polyacrylated glycerol. The cross-linker and the polyacrylated glycerol polymer are mixed with water to form an adhesive. The adhesive is then blended with cellulosic particles or pieces to form a blend. The blend may then be formed into a desired shape.

In the creation of the cellulosic product, the polyacrylated glycerol is diluted with water and the cross linker is added to the mixture. The mixture is then applied to the wood product, such as wood chips or strands, coating the chips or strands on all surfaces. The coated wood chips or strands are then optionally pressed and heated.

Furthermore the inventive method includes shaping the adhesively bound wooden particles into a board.

A final embodiment of the method includes pressing the blend with a pressure ranging from 50 to 300 psia, at a temperature of 120 to 200° C., for 2 to 20 minutes.

Typical Oriented strand board (OSB) has multiple layers of wood "flakes" or "strands" bonded together by a binding material. The flakes are made by cutting thin slices with a knife edge parallel to the length of a debarked log. The flakes are typically 0.01 to 0.5 inches thick, although thinner and thicker flakes can be used in some applications, and are typically, less than one inch to several inches long and less than one inch to a few inches wide. The flakes typically are longer than they are wide. In the fabrication of oriented strand board, the flakes are first dried to remove water, and are then coated with a thin layer of binder and sizing agent. The coated flakes are then spread on a conveyor belt in a series of alternating layers, where one layer will have the flakes oriented generally in line with the conveyor belt, and the succeeding layer of flakes oriented generally perpendicular to the conveyor belt, such that alternating layers have flakes oriented generally perpendicular to one another. The word "strand" is used to signify the cellulosic fibers which make up the wood, and, because the grain of the wood runs the length of the wood flake, the "strands" in the oriented strand board are oriented generally perpendicular to each other in alternating layers. The layers of oriented "strands" or "flakes" are finally subjected to heat and pressure to fuse the strands and binder together. The resulting product is then cut to size and shipped.

Oriented strand board (OSB) and methods for producing the same are generally known and are disclosed, e.g., in U.S. Pat. Nos. 6,136,408; 6,098,679; 5,718,786; 5,525,394; 5,470,631; 5,443,894; 5,425,976; 5,379,027; and 4,364,984, which are hereby incorporated by reference in their entirety.

Plywood is a glued wood panel comprised of relatively thin layers or plies. Generally, in the production of plywood, a wet log is taken out of water, and then sawed to a desired length and cut by means of a rotary lathe to wet veneers of 0.5 to 7 mm in thickness, which are then dried, coated with an adhesive composition, laminated, and bonded by hot-pressing to obtain plywood. The process for making plywood is well known in the art and is disclosed in U.S. Pat. Nos. 2,557,071; 3,658,638; and 3,137,607, which are hereby incorporated by reference in their entirety.

Particle board, or chipboard, is fabricated from wood fragments such as chips using a thermosetting resin to bond the particles together. The customary process of manufacturing particle board involves the blending of the binder with the wood or wood-related particles into a substantially dry blend. This blend is deposited onto a moving mat or belt (hereinafter "belt" for simplicity) either by an "air laying process" or laid onto the belt following wetting; both processes well known in the field. The final particle board is manufactured by pressing the material deposited on the belt into the final particle board with the required density. Commonly, the material will be pressed in a two-step process. A prepressing applied to the material on the mat may be used to reduce the size (that is, thickness) of the material prior to pressing to final density. Pressing to final density then follows, often accompanied by simultaneous heating of the material. Both continuous pressing as well as pressing in a batch process are used in the industry. The density of the final particle board produced by this process is predetermined when material is deposited on the moving belt by adjusting the amount of material (per square foot) deposited on the moving belt prior to pressing. See U.S. Pat. No. 3,673,020, which is hereby incorporated by reference in its entirety. Particle board and chipboard along with the methods for producing them are known and have been disclosed in U.S. Pat. Nos. 3,440,189; 3,309,444; 5,695,875; 5,480,602; 3,673,020; and 5,059,466, which are hereby incorporated by reference in their entirety.

Oriented structural straw board (OSSB) is an engineered board of compressed non-woody lignocellulosic material, where the sands of straw are substantially oriented in a parallel fashion, and a resin binder. The process for making oriented structural straw board is known in the art and is disclosed in U.S. Pat. Nos. 5,932,038; 2,798,019; 5,932,038, U.S. Pat. App. Pub. No. US2013/0089699; and U.S. Pat. App. Pub. No. US2002/0100565, which are hereby incorporated by reference in their entirety.

Laminated veneer lumber (LVL) is obtained from logs of broad-leaved trees such as lauans and beech wood, or of acicular trees such as North American woods, Japanese cypress and cedar by chopping the log into longitudinal segments of selected length and turning the segments into veneer sheets of 2-3 mm thickness using a rotary lathe. Veneer sheets thus obtained typically are then dried using a veneer drier, laminated by arranging them in parallel in the grain direction, and bonded with adhesive. The laminated veneer sheets are subjected to a cold press for provisional compression prior to a hot press for heated compression. Alternatively, the laminated veneer sheets may be simply subjected to continuous press processing. Subsequently, the lamination of veneer sheets is flattened, cut into a given width and ground on a major surface with a sander to obtain an LVL. The process for making laminated veneer lumber is well known in the art and is disclosed in U.S. Pat. Nos. 5,234,747; 5,040,582; 5,662,760; and 4,844,763, which are hereby incorporated by reference in their entirety.

Glue-laminated timber or glulam is a structural timber product composed of several layers of dimensioned lumber glued together. By laminating several smaller pieces of wood, a single large, strong, structural member can be manufactured from smaller timbers, for use as ridge beams, garage door headers and floor beams, vertical columns or horizontal beams, often in curved, arching shapes for example. The process for making glulam is known in the art and is disclosed in U.S. Pat. Nos. 5,002,105; 4,568,577; and 6,446,412, which are hereby incorporated by reference in their entirety.

Cross laminated timber is created by gluing layers of timber together to form large panels. The layers are orientated so that the grain of timber within each layer is substantially parallel, and the grain in each layer is typically perpendicular to the grain of the immediately adjacent layers. This "cross-laminating" provides reliable strength and stability. The process for making cross laminated timber is known in the art and is disclosed in WO2015152735, and U.S. Pat. No. 6,960,277 which are hereby incorporated by reference in their entirety.

EXAMPLES

Example 1—Polymerized Acrylated Glycerol Production

The materials were mixed in the following order: 10 kg glycerol was slowly added to 10.43 kg Acrylic acid, 470 g Hydroquinone, and 1.50 kg Triphenylphosphine. The solution was heated to 125° C. while stirring and with a reflux column and stirred with heating for 36 hours. This resulted in a glycerol with an average of 1.2 acrylic groups per molecule.

The acrylated glycerol was polymerized by adding 5.55 kg acrylated glycerol, 23 kg methanol, 27.75 g Azobisisobutyronitrile, and 0.5772 g Ethyl (3-oxo-2-butanyl) carbonotrithioate into a reactor, purging with argon gas and then reacting at 71° C. for 8 hours. The polymer was precipitated out in a 2-propanol solvent and then decanted and dried. This resulted in a 54% yield of polymer product.

Example 2—Polyacrylated Glycerol Oriented Strand Board

PAG made to a target molecular weight of 2 Mda was diluted to 33 wt % solids in water with 0.1 wt % 4,4'-Azobis (4-cyanovaleric acid) added as a free radical thermal initiator. 10% wt. of polyacrylated glycerol was then applied with a HVLP sprayer onto wood strands tumbling in a rotating mixer. 233 grams of adhesive coated strands were then pressed in a 7"×7" form and next pressed in a Carver hot press at 400 psi and 400° F. (204° C.). Subsequent polyacrylated glycerol samples were prepared as above, but with the adhesive coated strands dried to lower moisture levels.

PMDI oriented strand board samples were made by applying 10% wt. of PMDI Rubinate 1840 with a HVLP sprayer onto wood strands tumbling in a rotating mixer. 220 grams of adhesive coated strands were then pressed in a 7"×7" form and next pressed in a Carver hot press at 400 psi and 400° F. (204° C.)

Internal Bond Strength (IBS) was determined using an Instron universal test frame. Test samples were prepared by cutting samples into 2"×2" coupons and adhering testing blocks to the top and bottom surfaces of the coupons with hot melt adhesive. The samples were then strained at a 1 mm/min rate until failure. The testing rig is shown in FIG. 1, showing the sample coupons being tested in the universal load frame.

The internal bond strength (tensile strength perpendicular to surface) was determined according to ASTM D1037 sections 28-33.

Figure 2A:
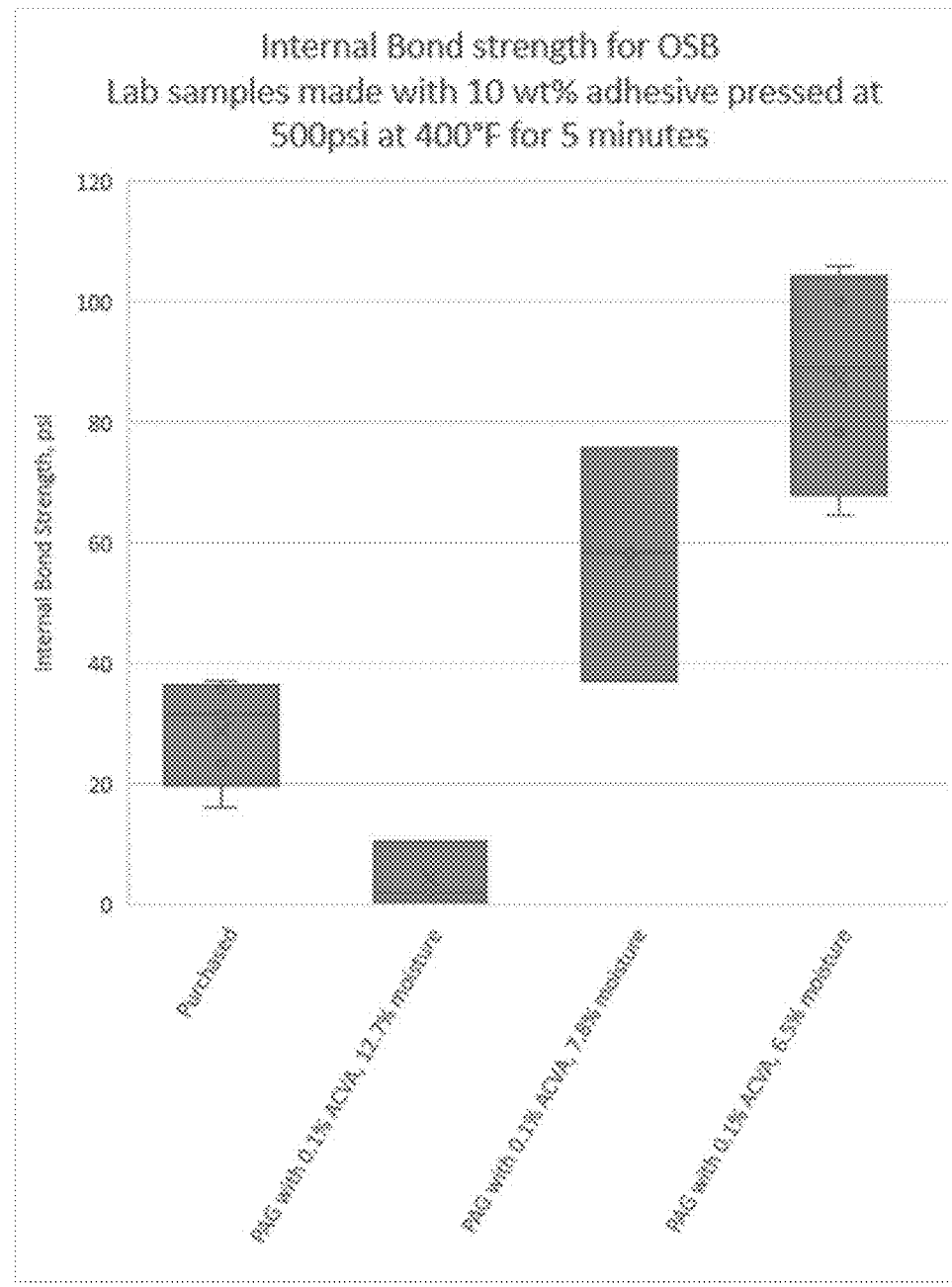
FIGS. 2A-B are graphs showing the internal bond strength for oriented strand board (OSB) for samples made with 10 wt % adhesive pressed at 500 psi at 400° F. for 5 minutes with varying amounts of total moisture.
Figure 2B:
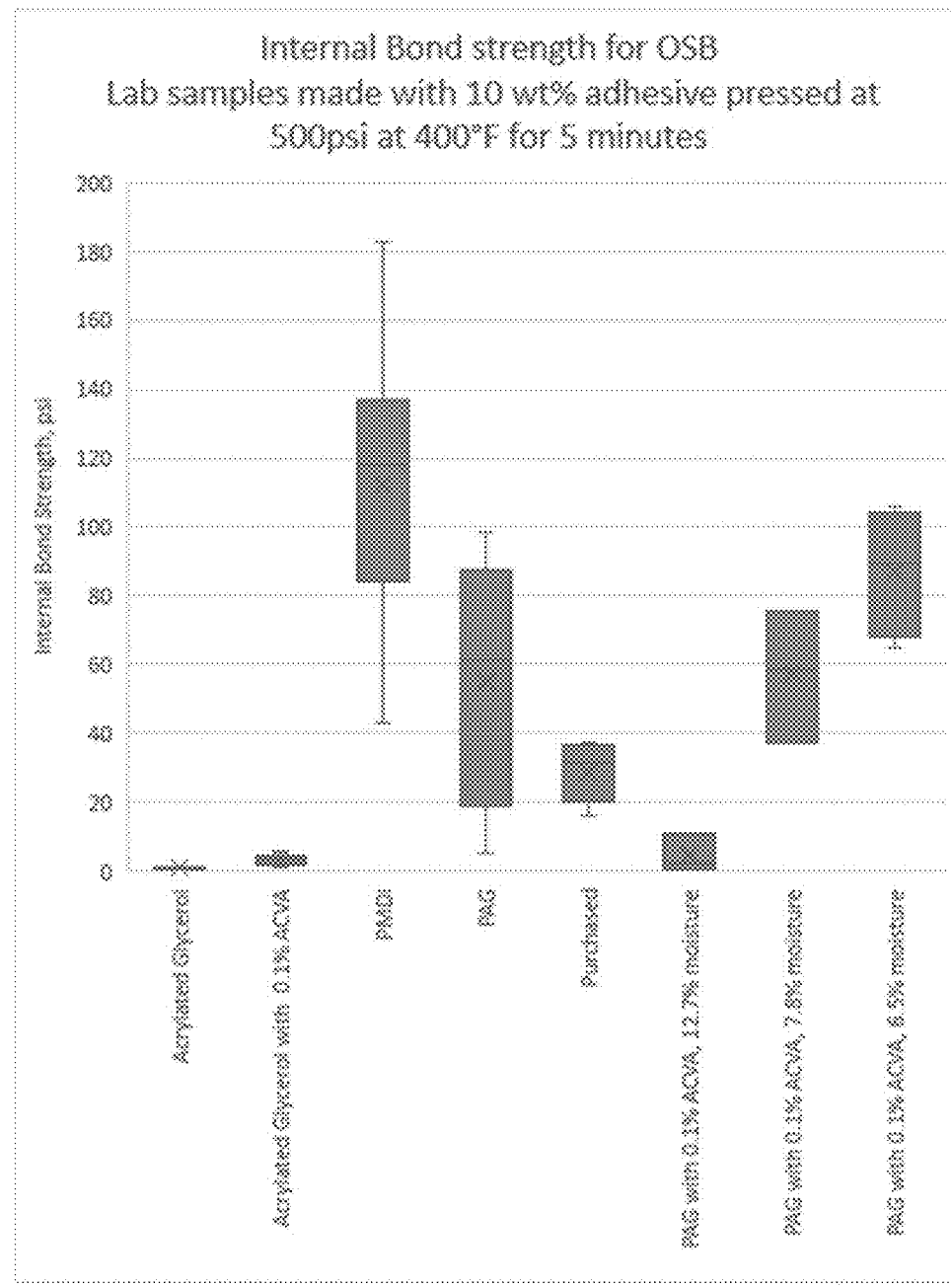

5 PMDI and 4 PAG 7"×7" samples were made. Each was cut into 4 test coupons. This was compared to the IBS of 6 coupons cut from purchased Georgia Pacific 23/32 CAT OSB RTD. The results of these tests are shown in Table 1, and FIGS. 2A and 2B.

TABLE 1

| IBS for samples made with 10 wt % adhesive pressed at 500 psi at 400° F. for 5 minutes. | | | | |
|---|---|---|---|---|
| | Control-Purchased Georgia Pacific 23/32 CAT OSB RTD | Rubinate 1840 PMDI | PAG with 0.1% ACVA, 12.7% moisture | PAG with 0.1% ACVA, 7.8% moisture | PAG with 0.1% ACVA, 6.5% moisture |
| average | 29 | 151 | 4 | 57 | 87 |
| stdev | 9 | 29 | 6 | 19 | 19 |

When total moisture was lowered to 7.8% before samples were compressed, the samples had greater than 50 psi IBS.

Example 3—Polyacrylated Glycerol Adhesive Overlap Shear Tests

Figure 3A:
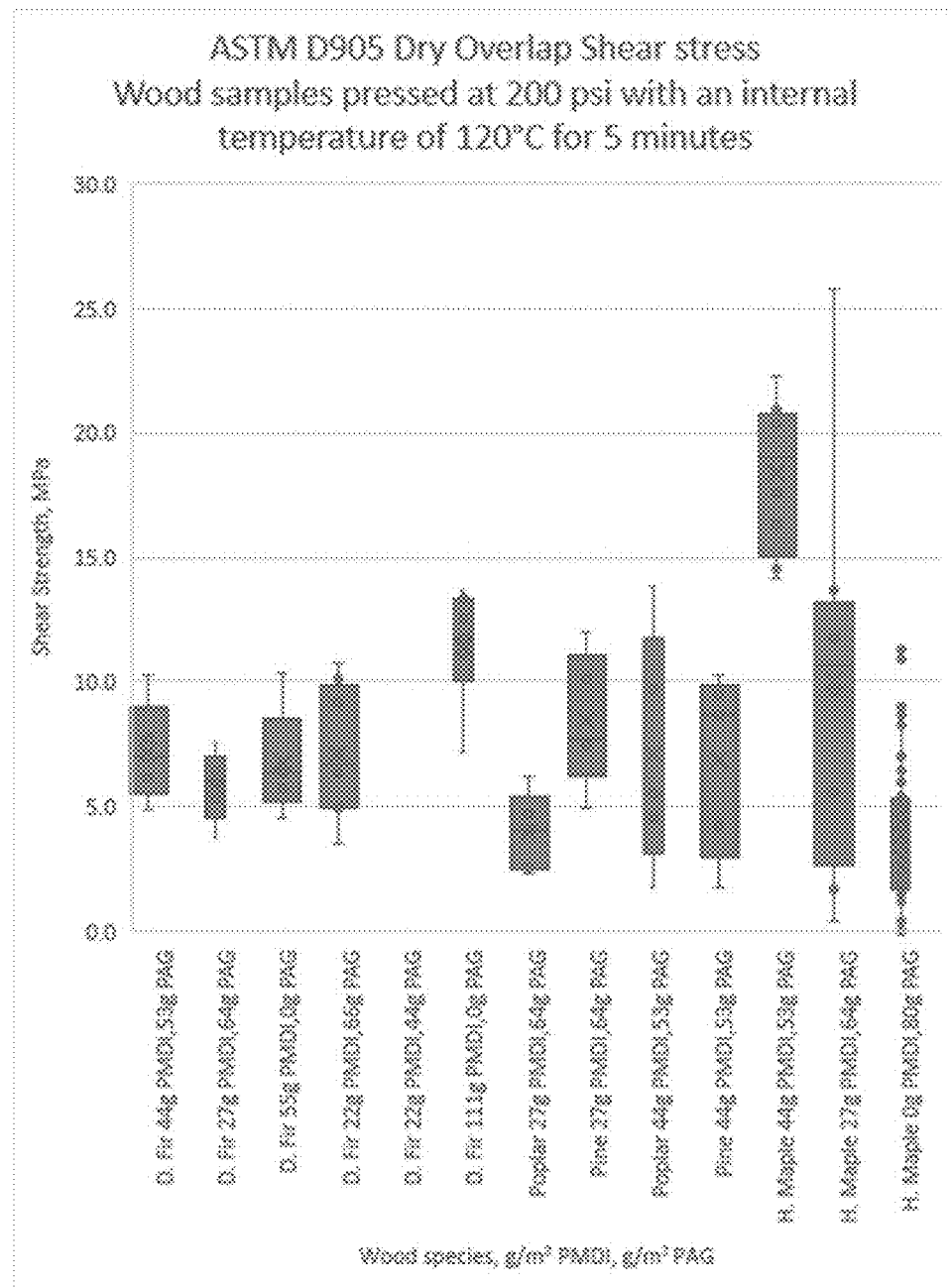
FIGS. 3A and 3B are graphs representing the results of ASTM D-905 dry overlap shear stress tests. The samples were heated to an internal temperature of 120° C. for five minutes and pressed at 200 psi.
Figure 3B:
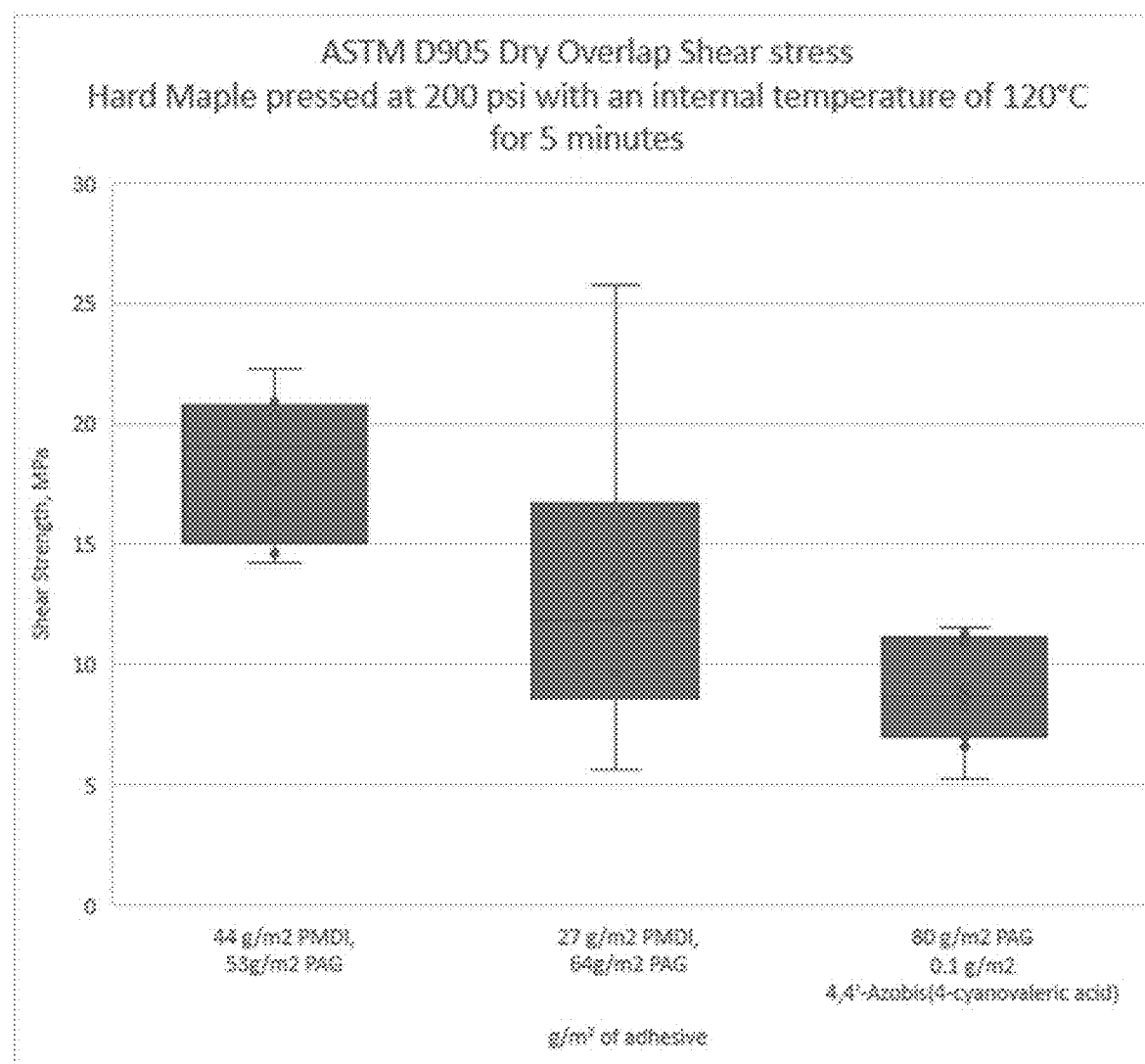

To determine the strength of the PAG—wood adhesive bond, overlap shear samples were prepared to ASTM D-905 specifications. Several samples had shear strengths over 10 MPa as shown in FIGS. 3A-B.

Example 4—Polyacrylated Glycerol Adhesive Plywood

A series of screening tests were run to determine PAG suitability for plywood applications. Wet vacuum and boil exposure tests from *PSI-95 Construction and Industrial Plywood* a publication of APA, the engineered wood association, were used to determine the water resistance of different methods of manufacturing plywood.

7"×10" 3 or 5 ply samples of plywood were made from 1/20" Douglas Fir and/or Poplar veneers. The following conditions were tested:
Amount of adhesive (5-20 mg/cm$^2$)
Curing time (5-30 min)
Free radical initiator type (AIBN, Cyanovaleric Azo, potassium persulfate)
Free radical initiator amount (0, 0.1%, 1%)
Additives
  a. PMDI—type and wt. %
  b. Polycup 8210 c. Diacrylates and dimethacrylates
d. Dichloroethane and dichloropropanes

Figure 4:
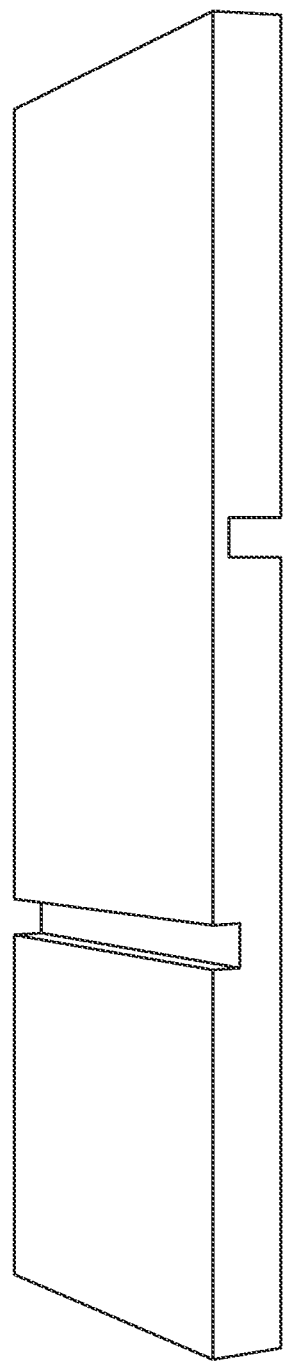
FIG. 4 is an image of a 5 ply coupon cut for overlap shear testing.

Samples were cut into 15 1"×3" coupons cut so that 5 coupons from each sample can be tested dry, after a wet vacuum test, and after the boiling water exposure test. A typical coupon is shown in FIG. 4.

In the wet vacuum test, samples were immersed in tap water, a vacuum of ~12 psig is applied for 30 minutes, the samples continue to be immersed for 4.5 hrs, and then are tested wet.

For the boiling exposure test, samples were boiled for 4 hours in tap water, dried at 65° C. for 15 hours in a convection oven, boiled for 4 additional hours in tap water, and then tested wet.

Figure 5:
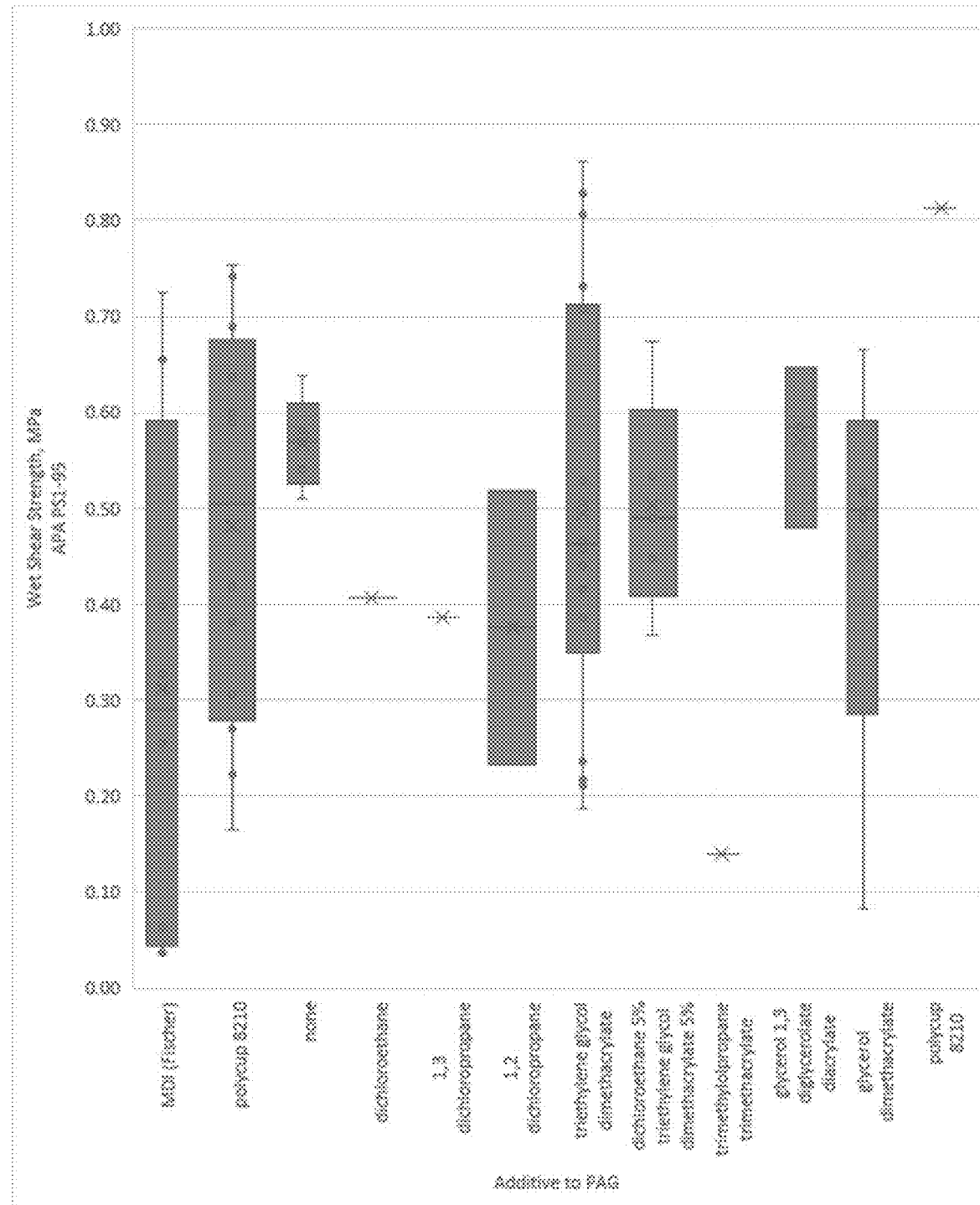
FIG. 5 is a graph illustrating the sheer strength for wet vacuum exposure screen testing results for three ply samples glued with different additives.
Figure 6:
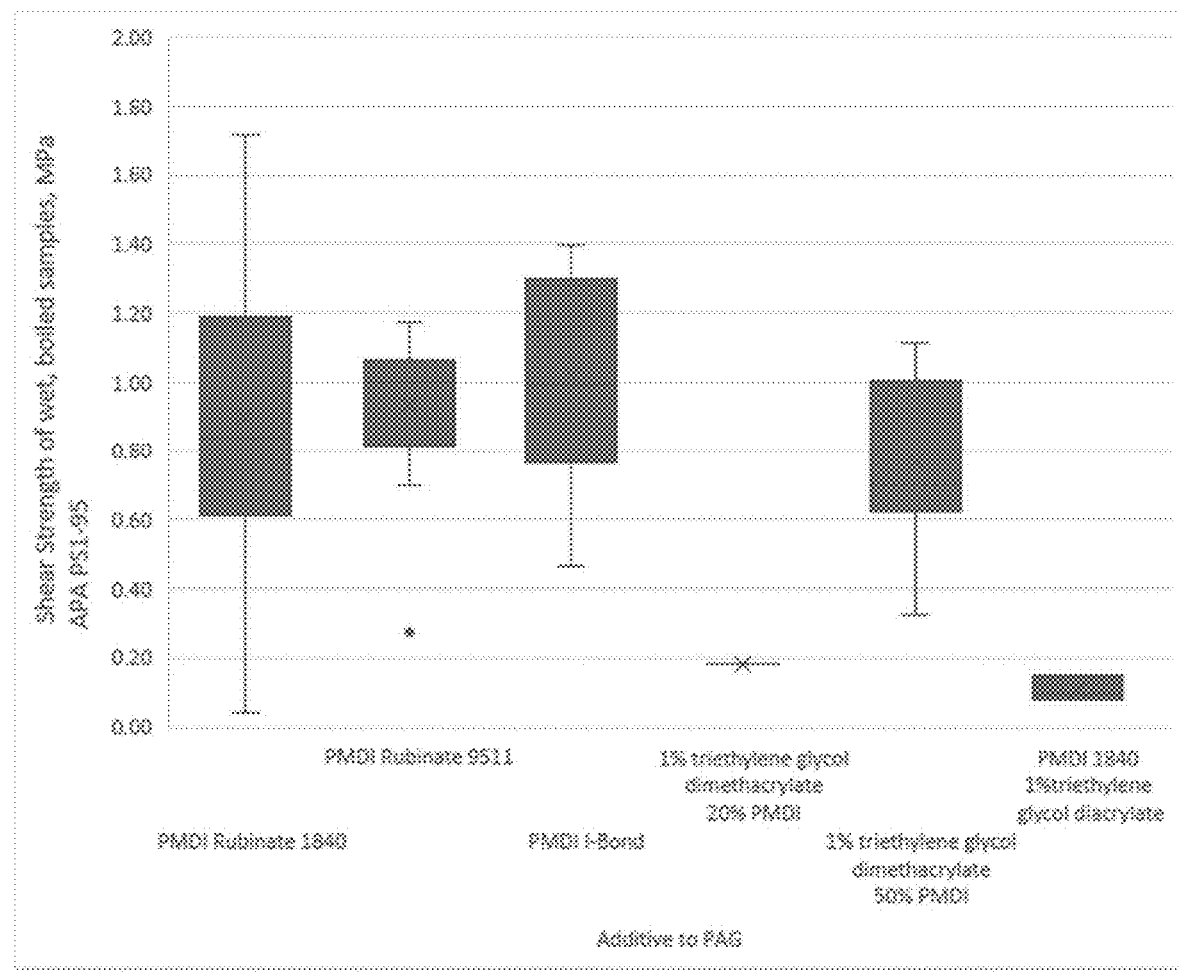
FIG. 6 is a graph illustrating the boiling water screening shear strength test results.

FIG. 5 and FIG. 6 show shear strength for the wet vacuum and boiling water exposure tests, respectively. Of particular note, only samples with PMDI survived the boiling water exposure.

At 10 mg/cm$^2$ adhesive, 50-80% replacement of PMDI with PAG results in samples with equal strength as 100% PMDI.

Figure 7A:
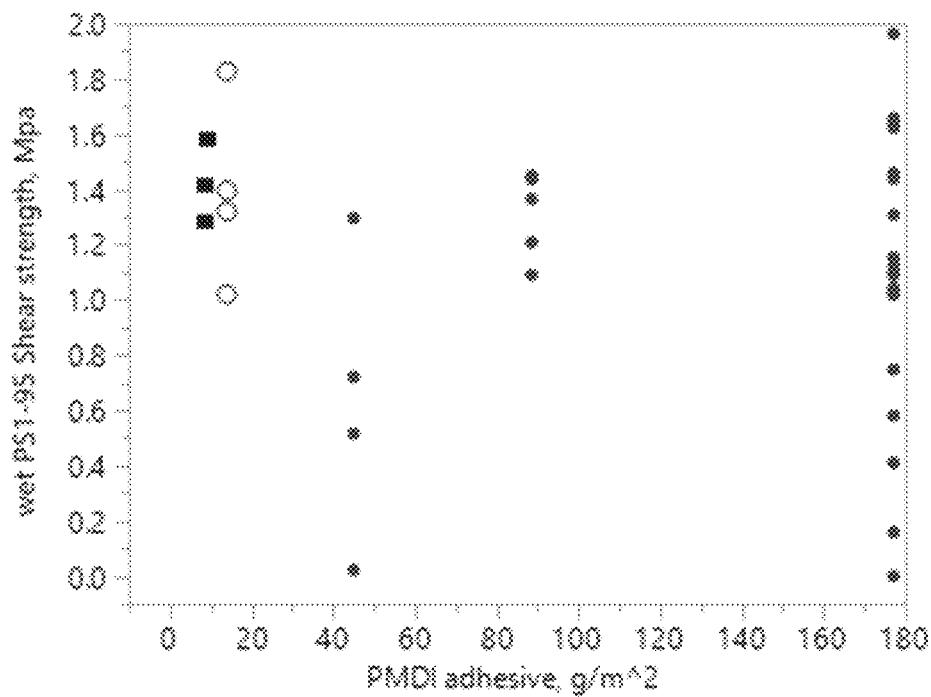
FIGS. 7A-B are graphs representing both the wet exposure (FIG. 10A) and boiling water (FIG. 10B) screening PS1-95 shear strength test results for samples of 14 g/m² PMDI, 45 g/m² PAG, and 0.1% potassium persulfate, which were hot pressed for 5 minutes at 250° C. and 200 psi, represented by the squares. Open circles indicate samples 9 g/m² PMDI, 48 g/m² PAG, 0.1% potassium persulfate, 250° C. and 200 psi hot pressed for 5 minutes. Dots indicate samples made with 100% PMDI at different application rates also pressed at 204° C., and 200 psi for 5 minutes.
Figure 7B:
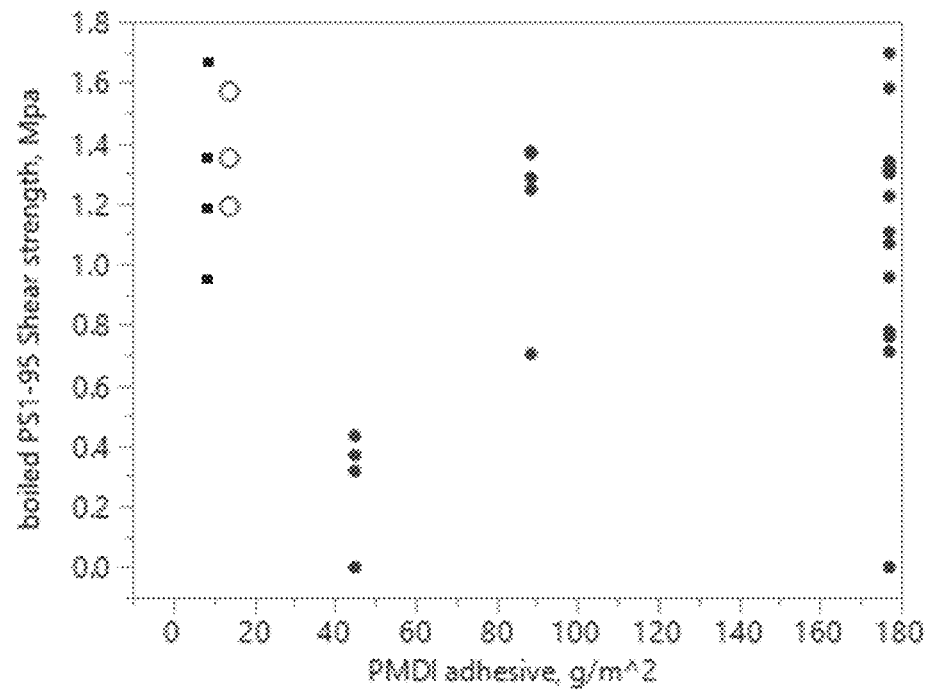

FIG. 7A illustrates the wet exposure screening PS1-95 shear strength test results for samples of plywood prepared with 14 g/m$^2$ PMDI, 45 g/m$^2$ PAG, and 0.1% potassium persulfate, which were hot pressed for 5 minutes at 250° C. at 200 psi, indicated by the squares. Samples of plywood prepared with 9 g/m$^2$ PMDI, 45 g/m$^2$ PAG, and 0.1% potassium persulfate, which were hot pressed for 5 minutes at 250° C. at 200 psi are indicated by the open circles. Samples of plywood prepared with 100% PMDI with different application rates, pressed at 204° C. at 200 psi for 5 minutes are indicated by the dots. FIG. 7B illustrates the boiling water screening PS1-95 shear strength test results for samples created under the same conditions as noted above.

Example 5—Polyacrylated Glycerol Adhesive Plywood

Particle boards were made with a rotary blender and southern yellow pine particle board finish. PAG was sprayed on to the pine at 46% solids. 1200 grams of wood was put into the blender and the adhesives were spray atomized onto the wood. Four 25 cm×25 cm boards were made at each blend load by pressing at 200° C. for 3 minutes to a thickness of 5.5 mm. See FIGS. 8A-B.

Figure 9:
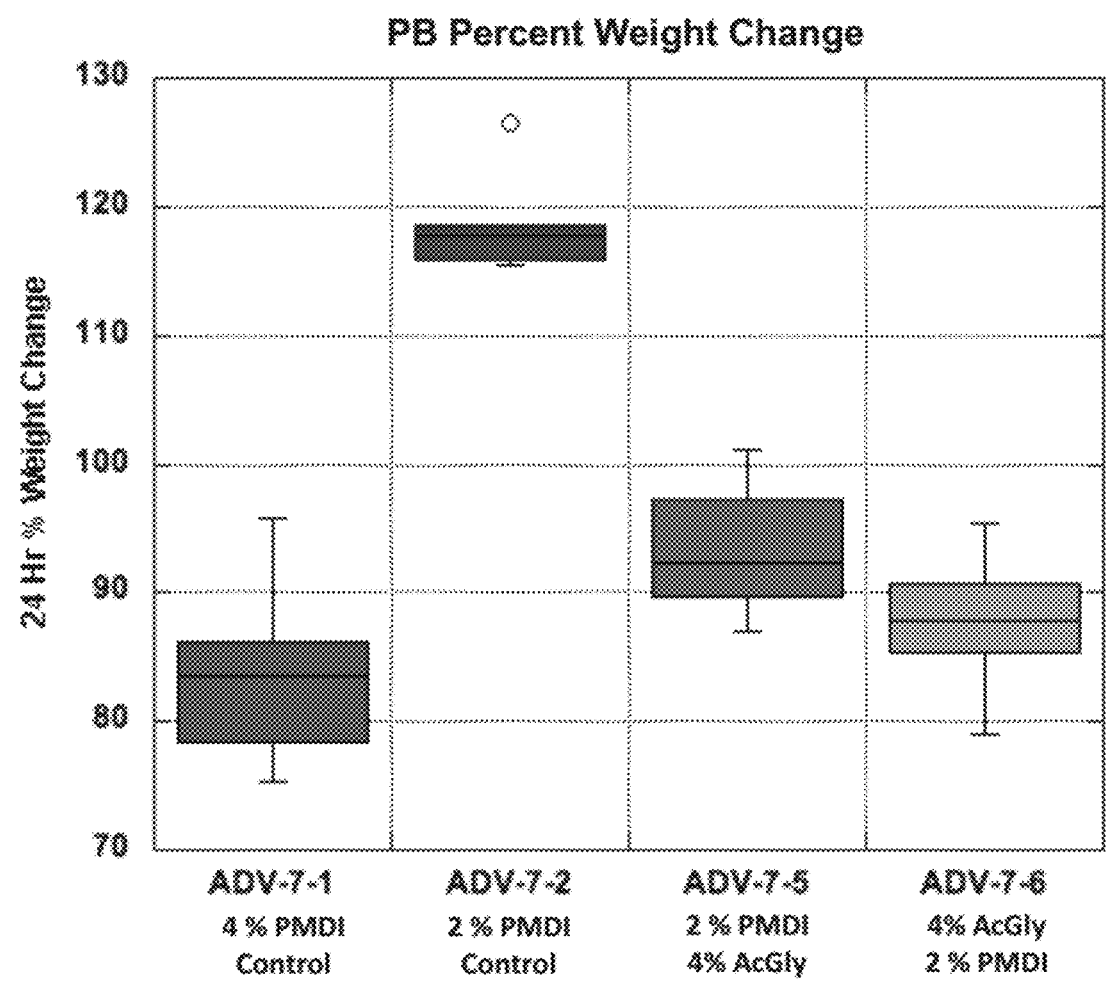
FIG. 9 is a graph representing weight gain over 24 hours in particle board samples made with PMDI and PAG adhesives. The weight gain after 24 hours in samples made from 2 wt % PMDI and 4 wt % PAG is similar to that of samples made with 4 wt % PMDI, and 30% less than the weight gain in samples made with 2 wt % PMDI.

Particle board samples made with 4 wt % PAG and 2 wt % PMDI had water resistance properties similar to samples made with 4 wt % PMDI after being soaked in water for 24 hours as shown in FIG. 9. The weight gain after 24 hours in samples made from 2 wt % PMDI and 4 wt % PAG is similar to that of samples made with 4 wt % PMDI, and 30% less than the weight gain in samples made with 2 wt % PMDI. These tests were performed by measuring the weight gain of eight 9 cm×2 cm×0.8 cm samples for each adhesive blend.

Figure 10:
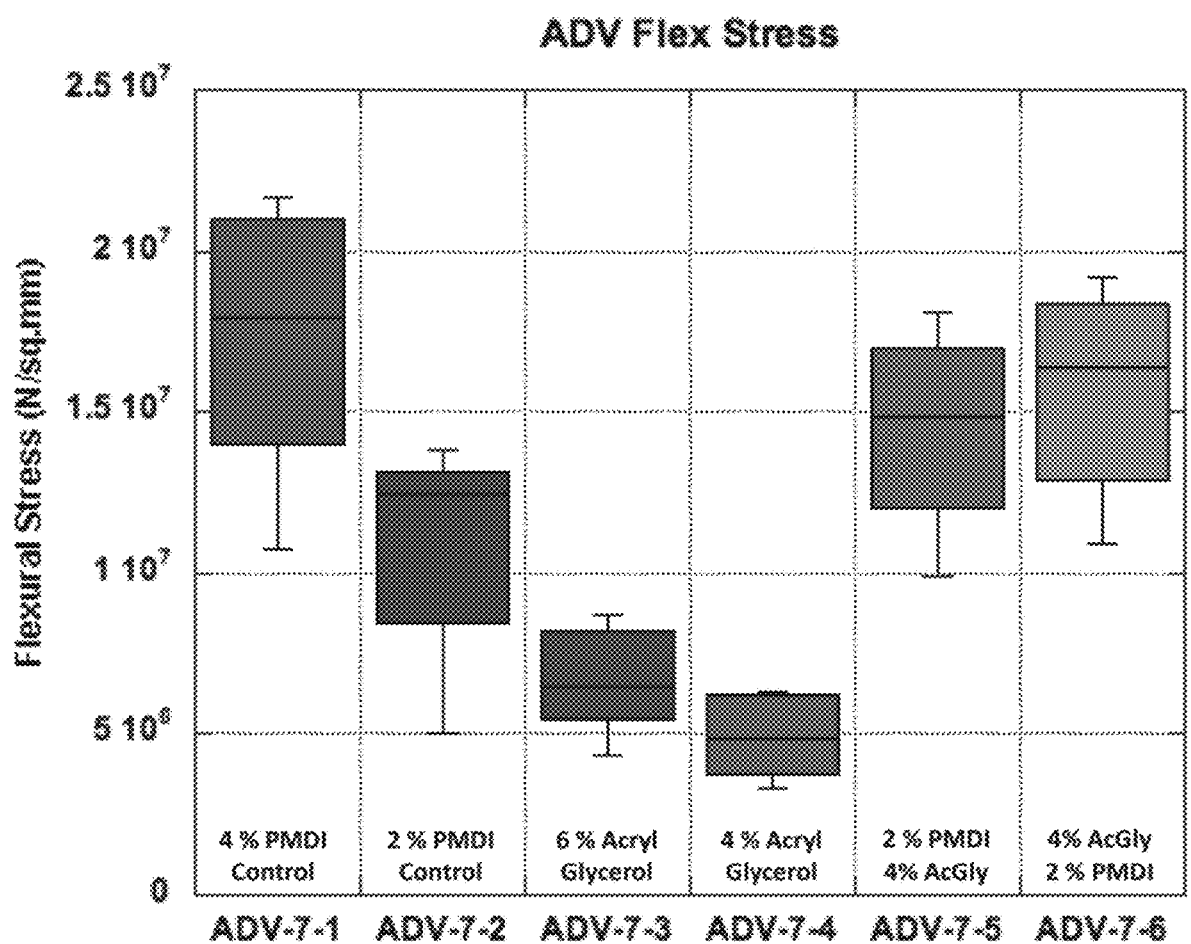
FIG. 10 is a graph representing the flexural stress of particle board made with two controls: 4 wt % PMDI and 2 wt % PMDI, compared with samples made with 2 wt % PMDI and 4 wt % PAG with the first of these two batches of samples having the PMDI sprayed onto the particles first, and the second batch having the PAG spray applied first. These graphs show that 2 wt % PMDI with 4 wt % PAG has similar flexural stress to boards made with 4 wt % PMDI and superior flexural strength to boards made with 2 wt % PMDI.

Particle board samples made with 4 wt % PAG and 2 wt % PMDI showed flexural strength superior to samples made with 2 wt % PMDI and similar to samples made with 4 wt % PMDI as shown in FIG. 10. These three point bend tests were performed on an IMADA MV-275 test stand with eight samples for each adhesive blend. The samples were 195±4 mm in length, 21±0.5 mm in width, and 8±1 mm thick. The span length was 127.5±0.05 mm, and the crosshead speed was 25.4 mm/min.

Example 6—Creation of Medium Density Fiberboard (MDF)

MDF boards were made with a rotary blender and MDF fiber. PAG was sprayed on to the MDF fiber at 46% solids. 1200 grams of wood was put in the blender and the adhesives were spray atomized onto the wood. 4 boards were made at each blend load by pressing at 200° C. for 3 minutes to a thickness of 6 mm.

Figure 11:
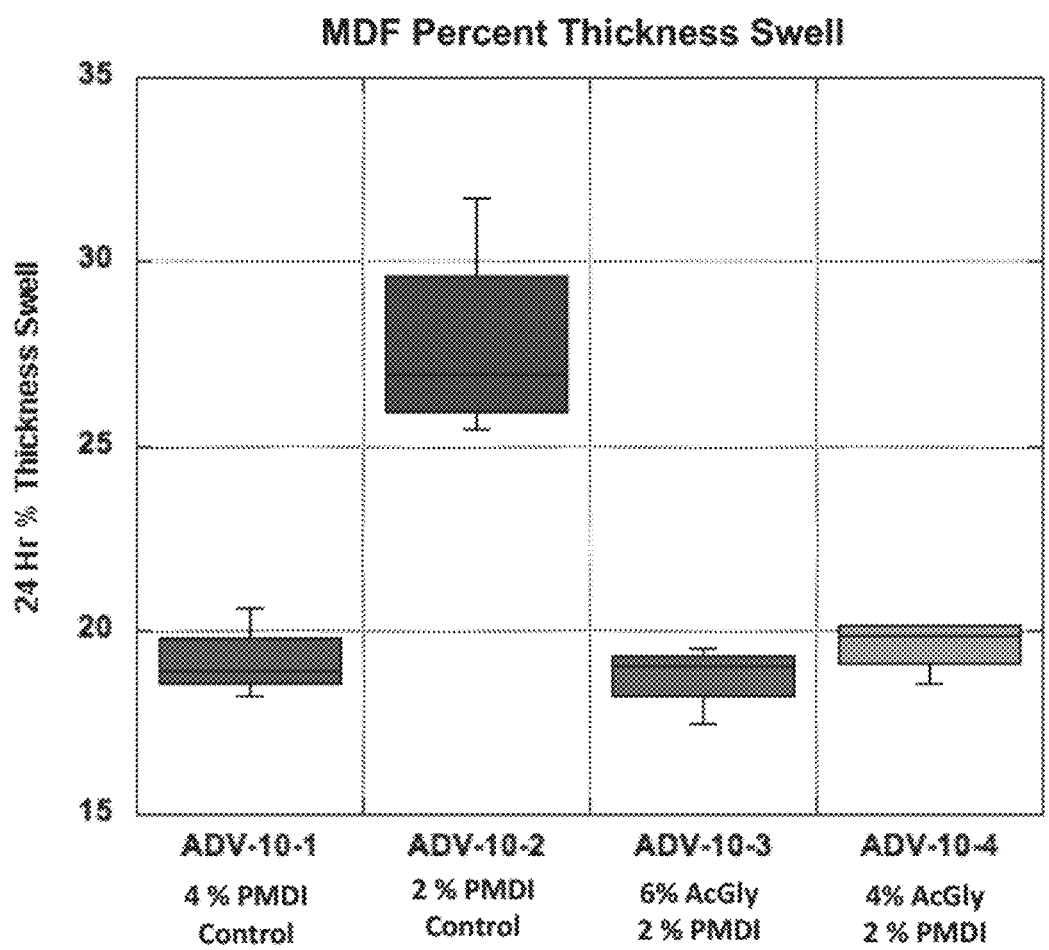
FIG. 11 is a graph representing the thickness swell over 24 hours in MDF samples made with PMDI and PAG adhesives. The thickness swell after 24 hours in samples made from 2 wt % PMDI and 6 wt % PAG and 2 wt % PMDI and 4 wt % PAG is similar to that of samples made with 4 wt % PMDI, and less than the thickness swell in samples made with 2 wt % PMDI.

MDF samples made with 4 wt % PAG and 2 wt % PMDI and MDF samples made with 6 wt % PAG and 2 wt % PMDI had flexural strength superior to MDF samples made with 2 wt % PMDI and similar to MDF samples made with 4 wt % PMDI after being soaked in water for 24 hours as shown in FIG. 11. These tests were performed by measuring the change in thickness of eight 9 cm×2 cm×0.8 cm samples for each adhesive blend after a 24 hour soak in water.

Figure 12:
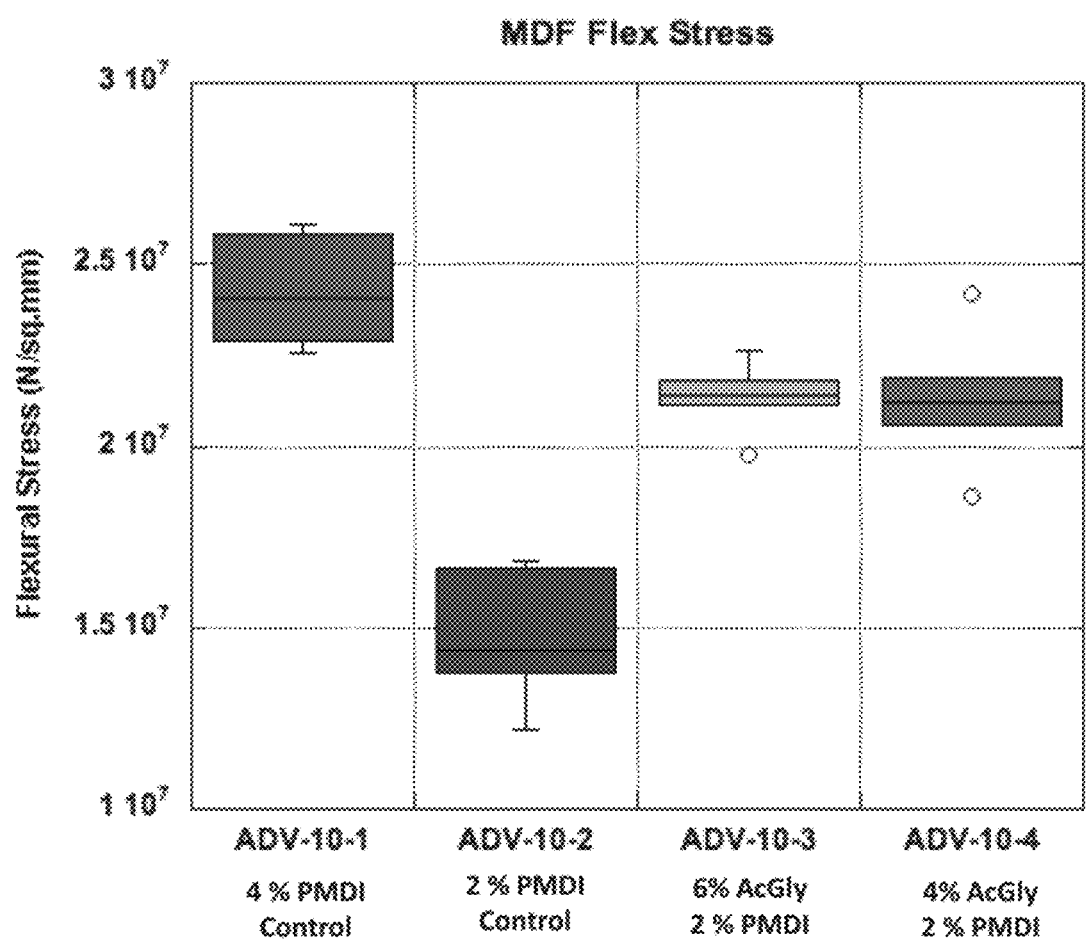
FIG. 12 is a graph representing the flexural stress of MDF made with two controls: 4 wt % PMDI and 2 wt % PMDI, compared with samples made with 6 wt % PAG and 2 wt % PMDI and samples with 4 wt % PAG and 2 wt % PMDI.

MDF samples made with 4 wt % PAG and 2 wt % PMDI and samples made with 6 wt % PAG and 2 wt % PMDI had flexural strength superior to samples made with 2 wt % PMDI and similar to samples made with 4 wt % PMDI as shown in FIG. 12. These three point bend tests were performed on an IMADA MV-275 test stand with eight samples for each adhesive blend. The samples were 195±4 mm in length, 21±0.5 mm in width, and 8 1 mm thick. The span length was 127.5±0.05 mm, and the crosshead speed was 25.4 mm/min.

MDF made with PAG shows an improvement in machinability as shown in FIGS. 13A-D. A groove was cut in the boards with a router. The MDF samples with PAG adhesive added to 2 wt % PMDI showed much less fiber pullout than samples made with 2 or 4 wt % PMDI.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A composition comprising:
   a thermoplastic polyacrylated glycerol polymer prepared by first reacting acrylic reagent with glycerol to form acrylated glycerol monomers and then polymerizing the acrylated glycerol monomers, wherein the thermoplastic polyacrylated glycerol polymer is predominantly non-crosslinked;
   water;
   cellulosic particles or pieces; and
   a cross linker reactive with the polyacrylated glycerol polymer and mixed with the polyacrylated glycerol, the cellulosic particles or pieces, and the water.

2. The composition of claim 1 further comprising:
   an additive selected from the group consisting of inhibitors, initiators, and copolymers.

3. The composition of claim 1, wherein the cross linker is selected from the group consisting of diisocyanates, anhydrides, multiply (meth)acrylated cross linkers, polyacids, and acid halides.

4. The composition of claim 3, wherein the cross linker is polymeric methylene diphenyl diisocyanate.

5. The composition of claim 1, wherein the thermoplastic polyacrylated glycerol polymer has a molecular weight ranging from 10 kDa to 10 MDa.

6. The composition of claim 1, wherein the thermoplastic polyacrylated glycerol polymer has a molecular weight ranging from 500 kDa to 2 MDa.

7. The composition of claim 1, wherein the thermoplastic polyacrylated glycerol polymer has a glass transition temperature ($T_g$) below 0° C.

8. The composition of claim 1, wherein the cellulosic particles or pieces are wood particles or pieces.

* * * * *

UNITED STATES PATENT AND TRADEMARK OFFICE
CERTIFICATE OF CORRECTION

| | |
|---|---|
| PATENT NO. | : 11,214,714 B2 |
| APPLICATION NO. | : 16/405697 |
| DATED | : January 4, 2022 |
| INVENTOR(S) | : Cochran et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 105 days.

Signed and Sealed this
Fourteenth Day of February, 2023

*Katherine Kelly Vidal*
Katherine Kelly Vidal
*Director of the United States Patent and Trademark Office*